(12) United States Patent
Nakata et al.

(10) Patent No.: US 10,323,757 B2
(45) Date of Patent: Jun. 18, 2019

(54) DIAPHRAGM VALVE

(71) Applicant: FUJIKIN INCORPORATED, Osaka-shi (JP)

(72) Inventors: Tomohiro Nakata, Osaka (JP); Tsutomu Shinohara, Osaka (JP); Michio Yamaji, Osaka (JP)

(73) Assignee: FUJIKIN INCORPORATED, Osaka-shi (JP)

( * ) Notice: Subject to any disclaimer, the term of this patent is extended or adjusted under 35 U.S.C. 154(b) by 84 days.

(21) Appl. No.: 14/907,942

(22) PCT Filed: Jul. 9, 2014

(86) PCT No.: PCT/JP2014/068289
§ 371 (c)(1),
(2) Date: Jan. 27, 2016

(87) PCT Pub. No.: WO2015/012105
PCT Pub. Date: Jan. 29, 2015

(65) Prior Publication Data
US 2016/0290515 A1    Oct. 6, 2016

(30) Foreign Application Priority Data
Jul. 26, 2013  (JP) ................. 2013-155299

(51) Int. Cl.
*F16K 7/14*    (2006.01)
*F16K 7/12*    (2006.01)

(52) U.S. Cl.
CPC ............... *F16K 7/14* (2013.01); *F16K 7/126* (2013.01)

(58) Field of Classification Search
CPC ... F16K 7/14; F16K 7/126; F16K 1/34; F16K 1/42; F16K 1/44; F16K 7/00; F16K 7/16
USPC .................. 251/360, 359, 331, 335.2, 335.1
See application file for complete search history.

(56) References Cited

U.S. PATENT DOCUMENTS

| 5,524,865 A | 6/1996 | Uchisawa et al. |
| 6,092,550 A | 7/2000 | Gotch et al. |
| 2003/0030023 A1* | 2/2003 | Wang ........... F15C 5/00 251/331 |

(Continued)

FOREIGN PATENT DOCUMENTS

| JP | 60-143968 U | 9/1985 |
| JP | 07-139649 A | 5/1995 |

(Continued)

OTHER PUBLICATIONS

International Search Report dated Sep. 2, 2014, issued for PCT/JP2014/068289.

(Continued)

*Primary Examiner* — Kevin F Murphy
*Assistant Examiner* — Kelsey E Cary
(74) *Attorney, Agent, or Firm* — Locke Lord LLP

(57) ABSTRACT

Provided is a diaphragm valve in which seat leak occurrence is drastically decreased. A depression 14 is provided at a radially middle part of a top of the seat 11. A first seal portion 17 is provided between a diaphragm 6 and a radially inward part 15 of the top of the seat 11. A second seal portion 18 is provided between a diaphragm 6 and a radially outward part 16 of the top of the seat 11. An outer circumferential surface 14b of the depression 14 has a cylindrical surface.

7 Claims, 4 Drawing Sheets

(56) References Cited

U.S. PATENT DOCUMENTS

2012/0021529 A1* 1/2012 Nachef .............. F16K 99/0001
                                                    436/180
2012/0097881 A1   4/2012 Aoyama
2014/0231693 A1*  8/2014 Terashima .............. F16K 25/00
                                                    251/333

FOREIGN PATENT DOCUMENTS

| JP | 3372091 B2    | 1/2003  |
|----|---------------|---------|
| JP | 2005-024013 A | 1/2005  |
| JP | 2008-304067 A | 12/2008 |
| JP | 2012-092861 A | 5/2012  |

OTHER PUBLICATIONS

Notification of Reason for Refusal dated Apr. 17, 2017, issued for the corresponding KR patent application No. 10-2016-7001008 and English translation thereof.

* cited by examiner

DIAPHRAGM VALVE

TECHNICAL FIELD

The present invention relates to a diaphragm valve.

BACKGROUND ART

A diaphragm valve using a diaphragm as a valve body has been conventionally well known. The conventional diaphragm valve is shown in FIG. 6.

In FIG. 6, a diaphragm valve 1 includes a block-like body 2 having a fluid inflow channel 2a, a fluid outflow channel 2b, and a depression 2c opening upward, a cylindrical hood 3 having a lower end portion screwed into an upper portion of the depression 2c of the body 2 and extending upward, a casing 4 screwed into the hood 3, an annular seat 5 made of synthetic resin and disposed on a circumferential edge of the fluid inflow channel 2a, a diaphragm 6 that is pressed against or separated from the seat 5 to open and close the fluid inflow channel 2a, a diaphragm presser 7 that presses a central portion of the diaphragm 6, and an actuator (not shown) that is built in the hood 3 and the casing 4 and causes the diaphragm 6 to press against and separate from the seat 5 via the diaphragm presser 7.

In such a diaphragm valve 1, improving durability and reliability is an issue to be achieved. For example, in the above-described conventional diaphragm valve 1, as shown in FIG. 7 in an enlarged manner, in the case where a foreign substance A that has got into an area between the seat 5 and the diaphragm 6, there is a fear that leak L might occur.

Patent Literature 1 discloses that, in a diaphragm valve of a type different from that illustrated and described above, providing two projections on a seat achieves double seals, whereby durability and reliability are improved.

CITATION LIST

Patent Literature

Patent Literature 1: Japanese Patent No. 3372091.

SUMMARY OF THE INVENTION

Technical Problem

In the diaphragm valve shown in FIGS. 6 and 7, because the size of the contact area between the seat 5 and the diaphragm 6 is relatively small, even when two protrusions are provided on the seat 5, there is still a fear that leak (seat leak) might occur, and decreasing the seat leak further is therefore desired.

An object of the present invention is to provide a diaphragm valve with which seat leak occurrence is drastically decreased.

Solution to Problem

The diaphragm valve in accordance with the present invention is a diaphragm valve including: a body provided with a fluid inflow channel, a fluid outflow channel, and a depression opening upward; an annular seat disposed on a bottom surface of the depression of the body; and an elastically deformable diaphragm that is pressed against and separated from the seat to open and close the fluid inflow channel, the diaphragm valve characterized in that a depression is provided at a radially middle part of a top of the seat, a first seal portion is provided between the diaphragm and a radially inward part of the top of the seat, and a second seal portion is provided between the diaphragm and a radially outward part of the top of the seat.

The seat is, for example, made of polychlorotrifluoroethylene (PCTFE), but may be made of other synthetic resin. The material of the body is, for example, stainless steel (such as 316L), but not particularly limited thereto.

Conventionally, the top of the seat has an approximately flat surface in terms of securing contact area, and an entire surface of the top of the seat is brought into close contact with the diaphragm. In some cases, foreign substances such as corrosion products and chips are included in a fluid flowing in the diaphragm valve. When such a foreign substance gets into an area between the diaphragm and the top of the seat, there is a fear that seat leak occurs.

In the diaphragm valve in accordance with the present invention, the depression is provided at the radially middle part of the top of the seat. Therefore, the radially inward part of the top of the seat that forms a wall at a radially inward part of the depression and the radially outward part of the top of the seat that forms a wall at a radially outward part of the depression are made in close contact with the diaphragm, whereby the area between the diaphragm and the radially inward part of the top of the seat serves as the first seal portion that has a main seal function, and the area between the diaphragm and the radially outward part of the top of the seat serves as the second seal portion that has an auxiliary seal function. When a foreign substance gets into the first seal portion, there is a fear that a slight leak occurs from that portion, but because the second seal portion is provided, the leak is sealed by the second seal portion, resulting in prevention of seat leak.

The foreign substance that has got into the first seal portion is pressed by the fluid and enters the depression. The outer circumferential surface of the depression has a function of preventing the foreign substance from flowing out, and the foreign substance therefore remains in the depression. Since the depression has a function of retaining the foreign substance, the state of the foreign substance's getting into the first seal portion is resolved at an early stage, damage of the first seal portion is suppressed, and the possibility of the foreign substance getting into the second seal portion becomes extremely low, whereby seat leak is securely prevented.

In some cases, the bottom surface of the depression of the body is provided with an annular inner projection having a relatively small diameter and an annular outer projection having a relatively large diameter, the seat (the seat made of synthetic resin) is inserted between the inner projection and the outer projection, and at least one of the inner projection and the outer projection is caulked, whereby the seat is prevented from coming off. The shape of the seat described above is particularly useful for the diaphragm valve having such a configuration.

The outer circumferential surface of the depression provided at the radially middle part of the top of the seat preferably has a cylindrical surface. The outer circumferential surface having a cylindrical surface improves the effect of preventing the foreign substance from flowing out due to its outer circumferential surface as compared to the case of the outer circumferential surface having a tapered surface or a circular arc surface, whereby the function of the depression to retain the foreign substance is enhanced and therefore a function of preventing the seat leak is improved.

The configuration of the diaphragm valve other than the seat is an appropriate known configuration. For example, the actuator that causes the diaphragm to press against and separate from the seat may be one that uses compressed air, and may be of other configurations. The diaphragm is, for example, made of a nickel alloy sheet, but may be made of a stainless steel sheet or may be made of a laminated body composed of a stainless steel sheet and a nickel-cobalt alloy sheet.

Advantageous Effects of Invention

In the diaphragm valve in accordance with the present invention, even when a foreign substance gets into an area between the diaphragm and the radially inward part of the top of the seat, i.e., the first seal portion, and leak from this area occurs, this leak is sealed at an area between the diaphragm and the radially outward part of the top of the seat, i.e., the second seal portion, whereby seat leak is prevented. The depression provided at the radially middle part of the top of the seat has a function of retaining the foreign substance. The foreign substance that has got into an area between the diaphragm and the radially inward part of the top of the seat is pressed by a fluid and enters and remains in the depression, whereby the foreign substance's getting-into state is resolved at an early stage, damage of the first seal portion is suppressed, and the possibility of the foreign substance getting into the second seal portion becomes extremely low, whereby seat leak is securely prevented.

REFERENCE SIGNS LIST

2: body, 2a: fluid inflow channel, 2b: fluid outflow channel, 2c: depression, 6: diaphragm, 10: diaphragm valve, 11: seat, 14: depression, 14b: outer circumferential surface, 15: radially inward part, 16: radially outward part, 17: first seal portion, 18: second seal portion

DESCRIPTION OF EMBODIMENTS

Figure 6:
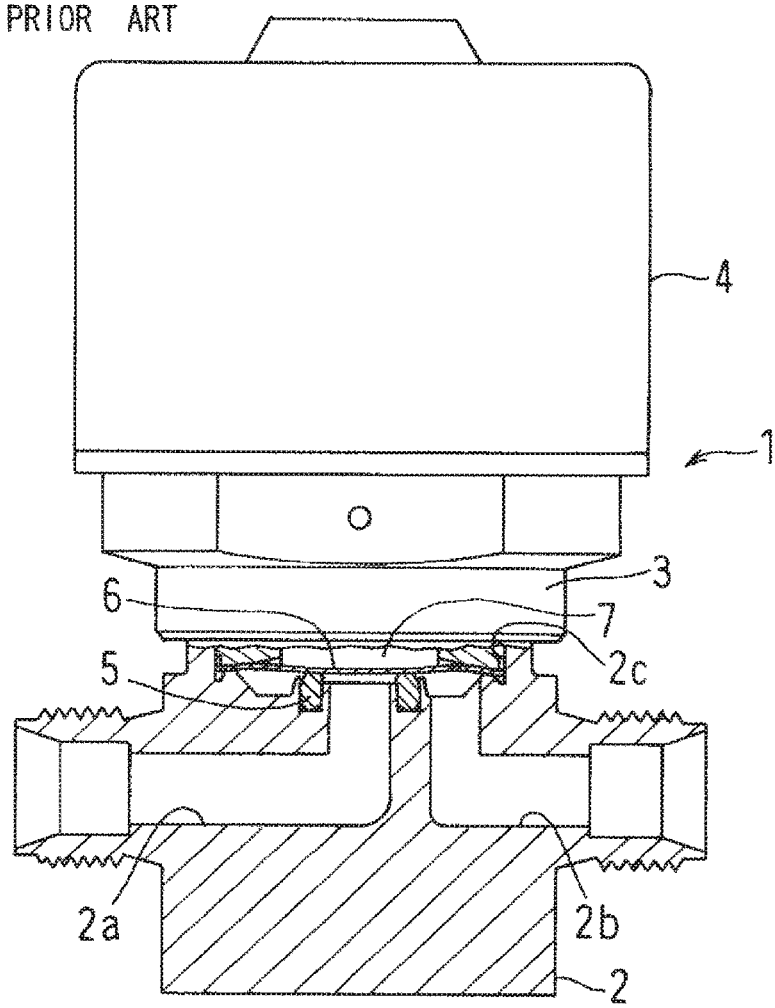
FIG. 6 is a longitudinal sectional view showing the conventional diaphragm valve.

Embodiments of the present invention will be described with reference to the drawings. In the following description, the overall view of the diaphragm valve is the same as that in FIG. 6 except for the seat, and is therefore not shown in the drawings. Only the seat portion, which is different from the conventional one, will be shown and described.

Figure 1:
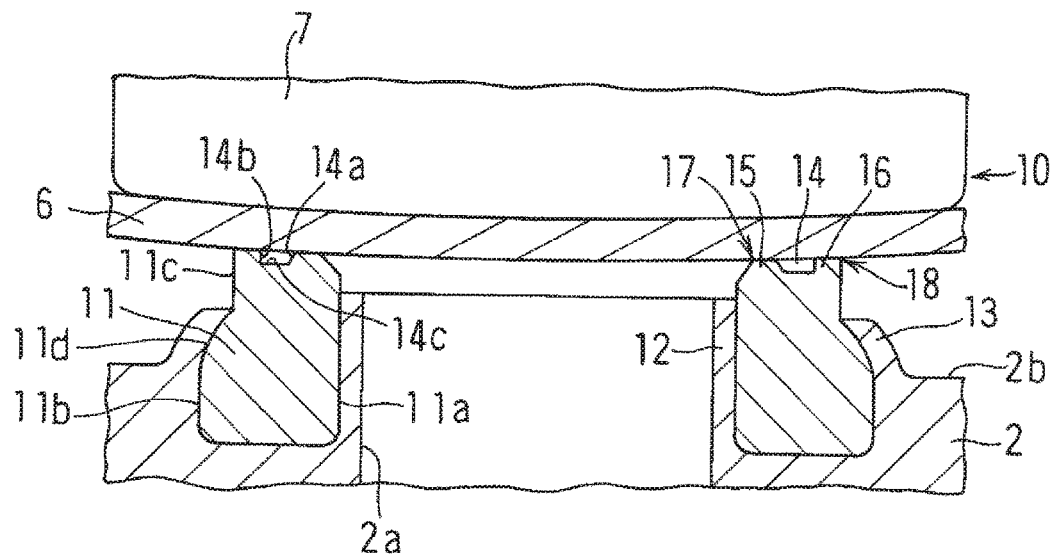
FIG. 1 is an enlarged longitudinal sectional view showing one embodiment of a diaphragm valve in accordance with the present invention.

FIG. 1 shows the main part of an embodiment of the diaphragm valve in accordance with the present invention. A diaphragm valve 10 includes a block-like body 2 having a fluid inflow channel 2a and a fluid outflow channel 2b; an annular seat 11 made of synthetic resin and disposed on a circumferential edge of the fluid inflow channel 2a, a diaphragm 6 that is pressed against or separated from the seat 11 to open and close the fluid inflow channel 2a, and a diaphragm presser 7 that presses a central portion of the diaphragm 6.

The seat 11 is made of polychlorotrifluoroethylene (PCTFE). The material of the body 2 is stainless steel such as 316L, for example.

The seat 11 has an annular body whose cross section is substantially rectangle. More specifically, an inner circumferential surface 11a thereof has a cylindrical surface, and an outer circumferential surface thereof has a large-diameter cylindrical surface 11b on the lower side, a small-diameter cylindrical surface 11c on the upper side, and a tapered surface 11d at the middle part.

The body 2 is provided with an annular inner projection 12 having a relatively small diameter and an annular outer projection 13 having a relatively large diameter. The seat 11 made of synthetic resin is inserted between the inner projection 12 and the outer projection 13. The inner projection 12 is caulked radially outward, and the outer projection 13 is caulked radially inward, whereby the seat 11 made of synthetic resin is prevented from coming off.

A depression 14 is formed at a radially middle part of the top of the seat 11. A radially inward part 15 of the top of the seat 11 forming a wall at a radially inward part of the depression 14, and a radially outward part 16 of the top of the seat 11 forming a wall at a radially outward part of the depression 14 are made in close contact with the diaphragm 6.

The diaphragm 6, when pressed against the seat 11, first comes into close contact with the radially inward part 15 of the top of the seat 11, and then comes into close contact with the radially outward part 16 of the top of the seat 11.

The depression 14 has an annular shape whose cross section is substantially a rectangle. In FIG. 1, an inner circumferential surface 14a of the depression 14 has a tapered surface, an outer circumferential surface 14b of the depression 14 has a cylindrical surface, and a bottom surface 14c of the depression 14 has a flat surface.

An area between the diaphragm 6 and the radially inward part 15 of the top of the seat 11 serves as a first seal portion 17, which has a main seal function. An area between the diaphragm 6 and the radially outward part 16 of the top of the seat 11 serves as a second seal portion 18, which has an auxiliary seal function.

Various foreign substances (wastes) exist in a fluid flowing within the diaphragm valve 10, which differ depending on installation locations and uses of the diaphragm valve 10. Examples of the foreign substances include corrosion products produced through reaction of the fluid flowing in the diaphragm valve 10, chips that enters from the outside, and the like. The flow of the fluid, when the diaphragm valve 10 is opened, is directed from the fluid inflow channel 2a to the fluid outflow channel 2b, i.e., from the inside of the seat 11 to the outside of the seat 11, and the flow of the foreign substance is also directed in the same manner as that of the fluid.

Figure 2:
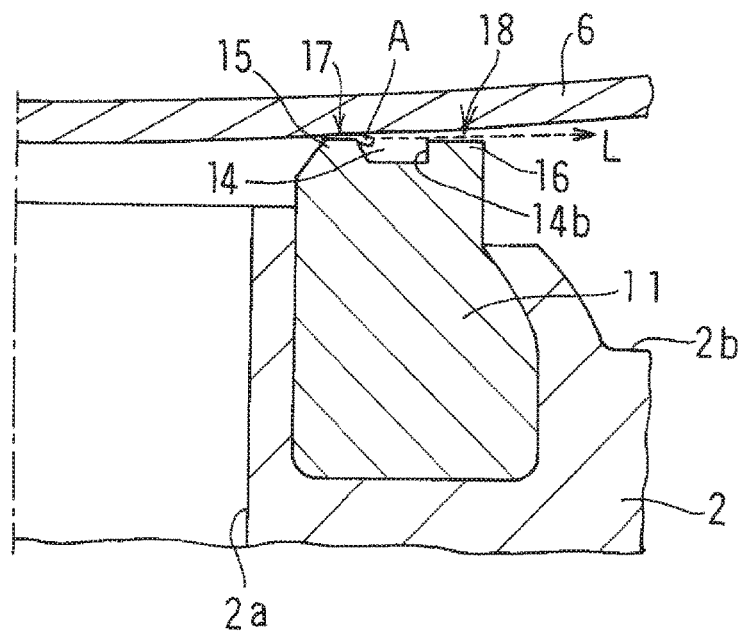
FIG. 2 is an enlarged longitudinal sectional view schematically showing seat leak in the foreign substance's getting-into state.

FIG. 2 shows a state immediately before the diaphragm valve 10 is in a fully-closed state. In this state, when a foreign substance A gets into an area (the first seal portion 17) between the diaphragm 6 and the radially inward part 15 of the top of the seat 11, a slight leak from this getting-into portion occurs. In the state immediately before the fully-closed state, the second seal portion 18 is not functioning, resulting in occurrence of seat leak L.

Figure 3:
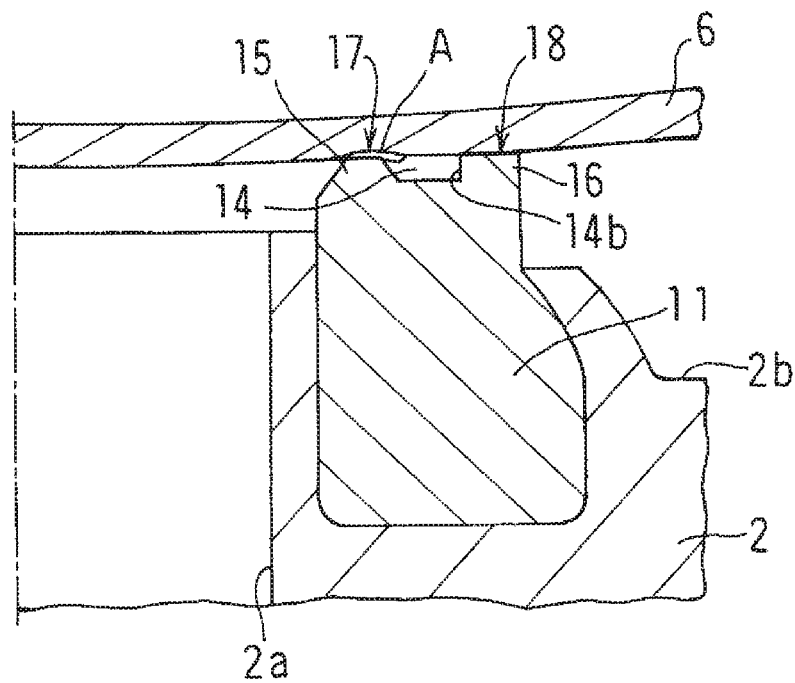
FIG. 3 is an enlarged longitudinal sectional view schematically showing prevention of seat leak in the foreign substance's getting-into state.

FIG. 3 shows a fully-closed state of the diaphragm valve 10, where the diaphragm 6 is further pressed from the state shown in FIG. 2. That is, in this state, the radially outward part 16 of the top of the seat 11 is in close contact with the diaphragm 6 to form the second seal portion 18, and the leak L that occurs in the state shown in FIG. 2 is sealed by the second seal portion 18, whereby seat leak is prevented.

Figure 4:
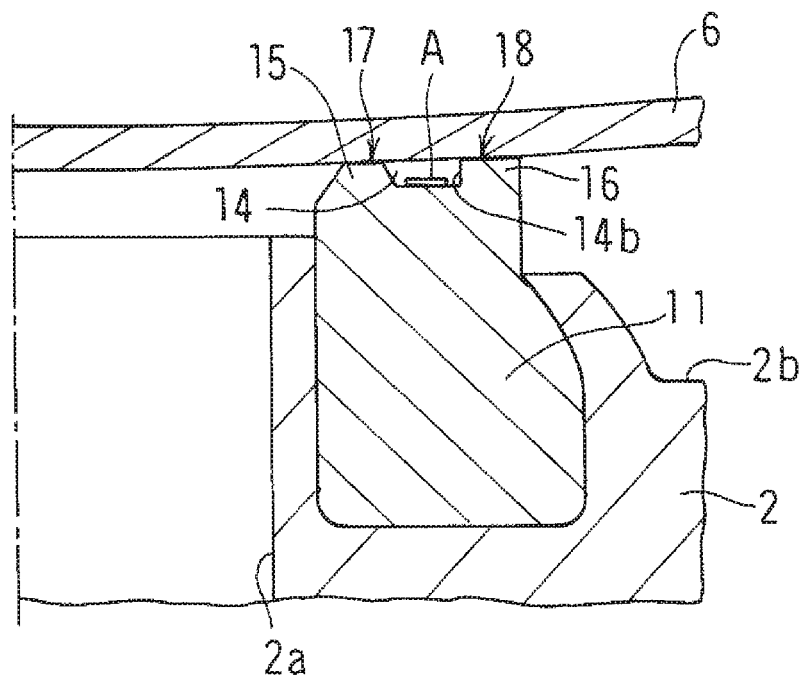
FIG. 4 is an enlarged longitudinal sectional view schematically showing a state where the foreign substance's getting-into state is resolved.

Thereafter, when the diaphragm valve 10 is in a fully-open state, the fluid flows from the fluid inflow channel 2a to the fluid outflow channel 2b, whereby the foreign substance A that has got in the first seal portion 17 enters the depression 14, as shown in FIG. 4. The depression 14 has an annular shape whose cross section is substantially a rectangle, and its outer circumferential surface 14b has a cylindrical surface. Therefore, the foreign substance A that enters the depression 14 is prevented from flowing out by the outer circumferential surface 14b, and the foreign substance A remains in the depression 14.

Although not shown in the drawings, simulating flow rate properties at the seat 11 portion revealed that a whirl of a fluid was produced in the depression 14 whereby it was confirmed that the foreign substance easily enters the depression 14.

In FIG. 4, the state of the foreign substance A of getting into the first seal portion 17 is resolved, the sealed state only by the second seal portion 18 is dissolved, and damage of the first seal portion 17 is suppressed. The possibility of the foreign substance getting into the second seal portion 18 becomes extremely low, and double seals by the first seal portion 17 and the second seal portion 18 are established, whereby high sealing performance is secured. As a result, seat leak is securely prevented.

Figure 5:
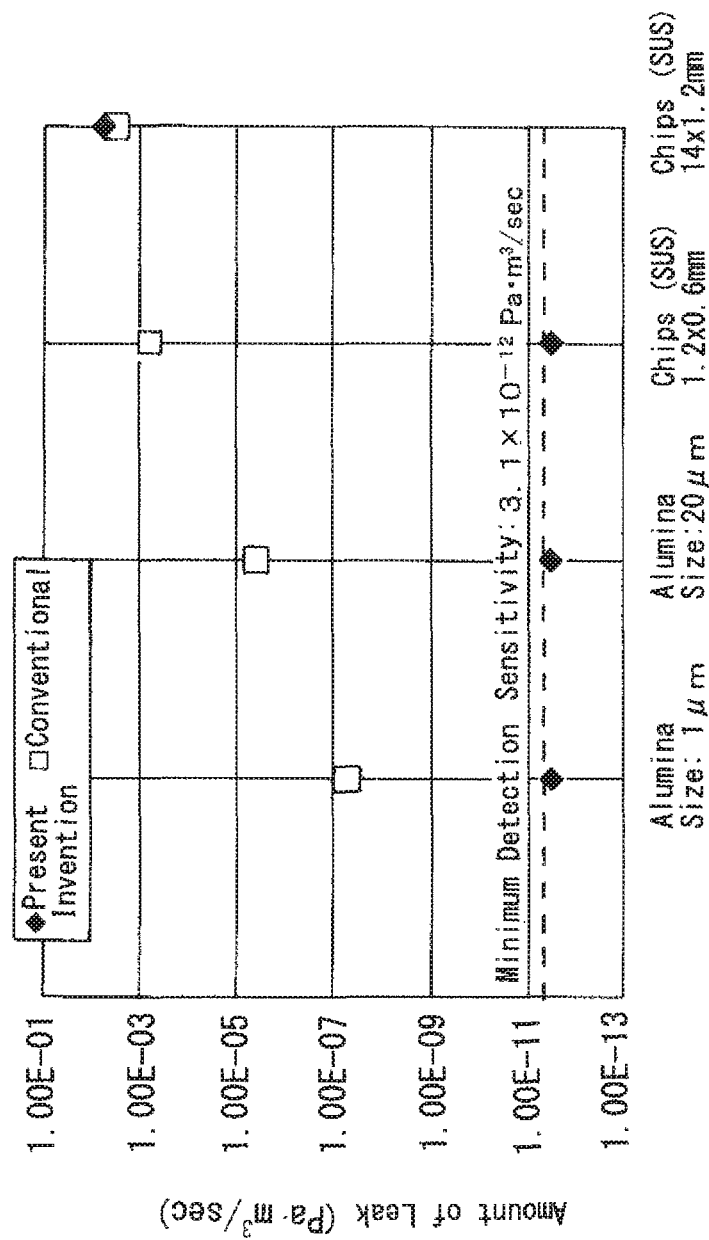
FIG. 5 is a graph in which the presence/absence of seat leak due to various foreign substances is compared for the diaphragm valve in accordance with the present invention and a conventional diaphragm valve.

FIG. 5 shows results of evaluation of sealing performance, using alumina (of two different sizes) as an example of the corrosion products, and SUS (stainless steel pieces) (of two different sizes) as an example of the chips. Sealing performance was evaluated through determining of the presence/absence of leak by forcefully mixing the foreign substances (alumina and SUS) with the nitrogen gas and then sending the obtained mixture to the diaphragm valve 10.

Figure 7:
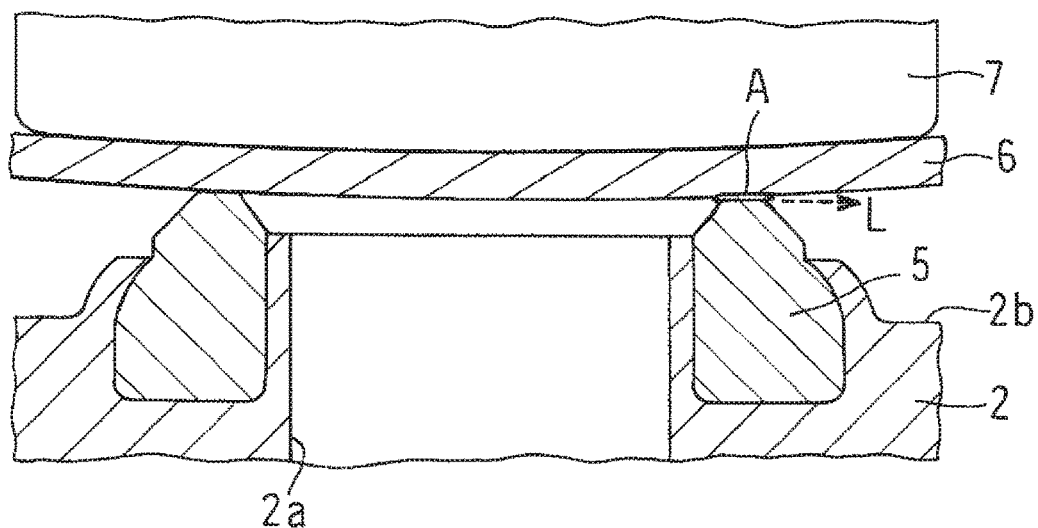
FIG. 7 is an enlarged longitudinal sectional view schematically showing seat leak in the conventional diaphragm valve.

As shown in FIG. 5, as for alumina having a particle size of as little as 1 µm, seat leak occurred in the case of the conventional seat 5 (the seat shown in FIG. 7), whereas seat leak did not occur in the case of the seat 11 in accordance with the present invention. The same results were obtained as for alumina having a particle size of 20 µm. As for SUS having a size of 1.2×0.6 mm, the amount of leak increased in the conventional seat as compared to alumina, whereas seat leak did not occur in the case of the seat 11 in accordance with the present invention. However, as for SUS having a length exceeding 10 mm, i.e., 14×1.2 mm, seat leak could not be prevented even in the case of the seat 11 in accordance with the present invention.

As described above, the shape of the outer circumferential surface 14b of the depression 14 is preferably a cylindrical surface, but the inner circumferential surface 14a of the depression 14 may have a tapered surface or a cylindrical surface, and the bottom surface 14c of the depression 14 may have a flat surface or a curved surface.

INDUSTRIAL APPLICABILITY

In diaphragm valves, decrease of leak (seat leak) is desired. In accordance with the present invention, occurrence of seat leak is drastically decreased. Therefore, the present invention contributes to improvement of durability and reliability of the diaphragm valve.

The invention claimed is:
1. A diaphragm valve comprising:
 a body including
  a fluid inflow channel,
  a fluid outflow channel, and
  an annular-shaped first depression contained in the body opening upward;
 an annular-shaped, sole, monolithic seat disposed on a bottom surface of the first depression of the body and separately formed from the body;
 an elastically deformable diaphragm that is pressed against and separated from the seat to open and close the fluid inflow channel;
 an annular-shaped second depression, co-axial with and overlapped by the first depression, completely contained inside the annular, sole, monolithic seat, provided at a radially middle part of a top surface of the seat;
 a first seal portion provided between the diaphragm and a radially inward part of the top surface of the seat; and
 a second seal portion provided between the diaphragm and a radially outward part of the top surface of the seat,
 wherein, an outer circumferential surface of the second depression provided at the radially middle part of the top of the seat has a cylindrical surface.
2. The diaphragm valve according to claim 1, wherein, an inner circumferential surface of the second depression has a tapered surface and a bottom of the second depression has a flat surface.
3. The diaphragm valve according to claim 1, wherein the bottom surface of the first depression of the body is provided with an annular inner projection and an annular outer projection, and the seat is inserted between the inner projection and the outer projection.
4. The diaphragm valve according to claim 1, wherein the seat is inserted between an annular inner projection and an annular outer projection both formed on the bottom surface of the first depression of the body.
5. The diaphragm valve according to claim 1, wherein the seat has a circular shape from a top view.
6. The diaphragm valve according to claim 1, wherein the seat has a cylindrical outer circumferential surface.
7. A diaphragm valve comprising:
 a body including
  a fluid inflow channel,
  a fluid outflow channel, and
  a first depression contained in the body opening upward;
 an annular sole, monolithic seat disposed on a bottom surface of the first depression of the body and separately formed from the body;
 an elastically deformable diaphragm that is pressed against and separated from the seat to open and close the fluid inflow channel;

a second depression completely contained inside the annular, sole, monolithic seat, provided at a radially middle part of a top surface of the seat;

a first seal portion provided between the diaphragm and a radially inward part of the top surface of the seat; and a second seal portion provided between the diaphragm and a radially outward part of the top surface of the seat, wherein, an outer circumferential surface of the second depression provided at the radially middle part of the top of the seat has a cylindrical surface, wherein the bottom surface of the first depression of the body is provided with an annular inner projection having a relatively small diameter and an annular outer projection having a relatively large diameter, the seat is inserted between the inner projection and the outer projection, and at least one of the inner projection and outer projection is caulked, whereby the seat is prevented from coming off.

* * * * *